United States Patent
Huebner et al.

(10) Patent No.: US 10,202,060 B2
(45) Date of Patent: Feb. 12, 2019

(54) SEAT LEVELER FOR TRANSPORTING CARGO

(71) Applicant: Ford Global Technologies, LLC, Dearborn, MI (US)

(72) Inventors: Annette Lynn Huebner, White Lake, MI (US); Johnathan Andrew Line, Northville, MI (US); Susan Drobyshewski, Plymouth, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 15/298,589

(22) Filed: Oct. 20, 2016

(65) Prior Publication Data

US 2018/0111532 A1  Apr. 26, 2018

(51) Int. Cl.
*B60N 3/00* (2006.01)
*A47B 31/06* (2006.01)
*B60N 2/90* (2018.01)
*B60N 2/02* (2006.01)

(52) U.S. Cl.
CPC .............. *B60N 3/00* (2013.01); *A47B 31/06* (2013.01); *B60N 2/02* (2013.01); *B60N 2/90* (2018.02); *B60N 2/919* (2018.02); *B60N 2002/905* (2018.02)

(58) Field of Classification Search
CPC ........ B60N 3/001; B60N 3/002; B60N 3/103; A47B 31/06
See application file for complete search history.

(56) References Cited

U.S. PATENT DOCUMENTS

| | | | |
|---|---|---|---|
| 2,875,940 A | 3/1959 | Dunn | |
| 2,877,073 A | 3/1959 | Malmer | |
| 3,318,456 A | 5/1967 | Lipe | |
| 3,326,446 A | 6/1967 | Goings | |
| 3,499,595 A | 3/1970 | Brooks | |
| 3,600,725 A | 8/1971 | McCartney | |
| 3,922,973 A * | 12/1975 | Sturgeon | A47B 23/00 108/26 |
| 4,052,944 A * | 10/1977 | Jennings | A47B 23/002 108/43 |
| 4,765,583 A * | 8/1988 | Tenner | A47B 23/002 108/43 |

(Continued)

*Primary Examiner* — Timothy J Brindley
(74) *Attorney, Agent, or Firm* — Vichit Chea; Price Heneveld, LLP (57) ABSTRACT

A seat leveler device is configured for use with a vehicle seating assembly having a rearwardly inclined seating surface. The seat leveler device includes a support portion having a conformable outer casing with a seat engaging surface arranged at an angle complimentary to an angle of the inclined seating surface. A support surface is supported by the support portion in a substantially horizontal manner. One or more anchor members having engagement features are tethered to either the support surface or the support portion, and are configured to couple to anchoring locations disposed on the vehicle seating assembly to retain the seat leveler device on the vehicle seating assembly. The seat leveler device may include retaining straps and a cage assembly for assisting in controlled transport of items.

17 Claims, 11 Drawing Sheets

(56) References Cited

U.S. PATENT DOCUMENTS

| | | | |
|---|---|---|---|
| 4,787,541 A * | 11/1988 | Pollard | A47B 31/06 108/44 |
| D329,944 S * | 10/1992 | Longtin | D12/423 |
| 5,409,198 A | 4/1995 | Roick | |
| 5,470,002 A | 11/1995 | DiStefano et al. | |
| 6,050,200 A * | 4/2000 | Sullins | A47B 23/002 108/25 |
| 6,187,398 B1 | 2/2001 | Eldridge | |
| 6,412,874 B1 | 7/2002 | Mayer | |
| 6,736,438 B1 * | 5/2004 | Wieclawski | B60N 3/002 296/24.3 |
| 6,986,308 B1 * | 1/2006 | King | A47G 23/0608 108/25 |
| 7,429,078 B1 | 9/2008 | Tarlow et al. | |
| 7,481,169 B2 | 1/2009 | Larson | |
| 7,637,551 B2 | 12/2009 | Mahaffy | |
| 7,794,021 B2 | 9/2010 | Sahashi | |
| 7,931,188 B2 | 4/2011 | Marinelli et al. | |
| 8,662,483 B2 | 3/2014 | Yamaguchi et al. | |
| 8,925,877 B2 * | 1/2015 | Carnevali | B60R 11/0252 248/122.1 |
| 9,039,081 B2 | 5/2015 | Arefi et al. | |
| 9,073,468 B2 | 7/2015 | Dixon et al. | |
| 9,108,553 B2 | 8/2015 | Medoro et al. | |
| 2002/0011505 A1 * | 1/2002 | Cole | B60R 5/00 224/275 |
| 2004/0134946 A1 | 7/2004 | Gammon | |
| 2006/0243782 A1 | 11/2006 | DeWolfe | |
| 2007/0113757 A1 * | 5/2007 | Lilly | A47B 23/002 108/25 |
| 2007/0119348 A1 * | 5/2007 | Evans | B60N 3/002 108/44 |
| 2008/0223913 A1 | 9/2008 | Nadeau | |
| 2009/0038515 A1 * | 2/2009 | Robinson | A47B 23/00 108/44 |
| 2009/0090834 A1 * | 4/2009 | Richter | A47B 23/00 248/346.01 |
| 2009/0223418 A1 * | 9/2009 | Ferrara | A45F 4/06 108/14 |
| 2010/0147861 A1 * | 6/2010 | Andochick | B60N 3/002 220/694 |
| 2012/0235451 A1 | 9/2012 | Hrdlicka | |
| 2016/0059758 A1 | 3/2016 | Huebner et al. | |
| 2017/0008438 A1 * | 1/2017 | Clark | B60N 2/64 |

* cited by examiner

SEAT LEVELER FOR TRANSPORTING CARGO

FIELD OF THE DISCLOSURE

The present disclosure generally relates to a seat leveler assembly, and more particularly to a seat leveler assembly for use with a seat, such as a vehicle seating assembly, wherein the seat leveler couples to the seat and provides a level support surface for transporting cargo.

BACKGROUND OF THE DISCLOSURE

In an effort to increase the comfortability of seating assemblies, seats and seatbacks are frequently angled inside a vehicle, thereby creating an uneven seating surface. This uneven seating surface is not desirable when transporting liquids or materials that can easily spill in containers that are generally configured for support on level support surfaces. Thus, a leveler system is desired that securely couples to a seating assembly.

SUMMARY OF THE DISCLOSURE

According to one aspect of the present disclosure, a seat leveler device is configured for use with a vehicle seating assembly having a rearwardly inclined seating surface. The seat leveler device includes a support portion having a conformable outer casing with a seat engaging surface arranged at an angle complimentary to an angle of the inclined seating surface. A support surface is supported by the support portion in a substantially horizontal configuration. One or more anchor members having engagement features are tethered to the support surface or the support portion, and are configured to couple to anchoring locations disposed on the vehicle seating assembly.

According to another aspect of the present disclosure, a seat leveler device for use with a vehicle seating assembly includes a support portion having a conformable outer casing filled with a shape-conforming medium. A support surface is coupled to the support portion and supported by the support portion in a substantially horizontal configuration on an inclined seating surface of the vehicle seating assembly. One or more anchor members having engagement features are tethered to the support surface or the support portion at rear portions thereof. The engagement features are configured to couple to anchoring locations disposed on the vehicle seating assembly.

According to yet another aspect of the present disclosure, a seat leveler device for use with a vehicle seating assembly includes a support portion having an outer casing filled with a shape-conforming medium. A support surface is disposed above the support portion. One or more anchor members include engagement features and are tethered to the support surface or the support portion and are configured to couple to anchoring locations disposed on the vehicle seating assembly.

These and other aspects, objects, and features of the present disclosure will be understood and appreciated by those skilled in the art upon studying the following specification, claims, and appended drawings.

DETAILED DESCRIPTION OF THE EMBODIMENTS

Figure 4:
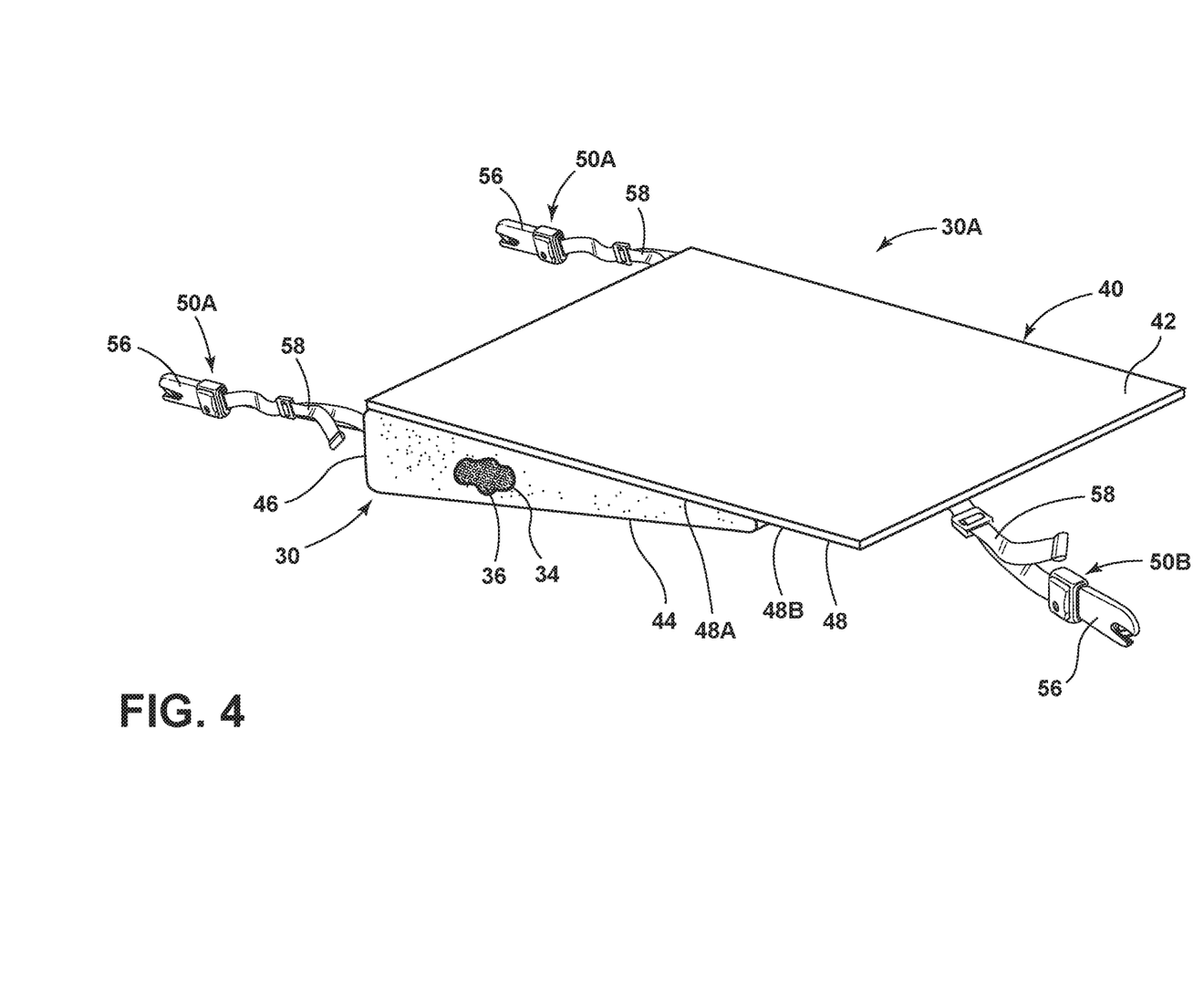
FIG. 4 is a top perspective view of the seat leveler device of FIG. 3.

For purposes of description herein, the terms "upper," "lower," "right," "left," "rear," "front," "vertical," "horizontal," and derivatives thereof shall relate to the disclosure as oriented in FIG. 4. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
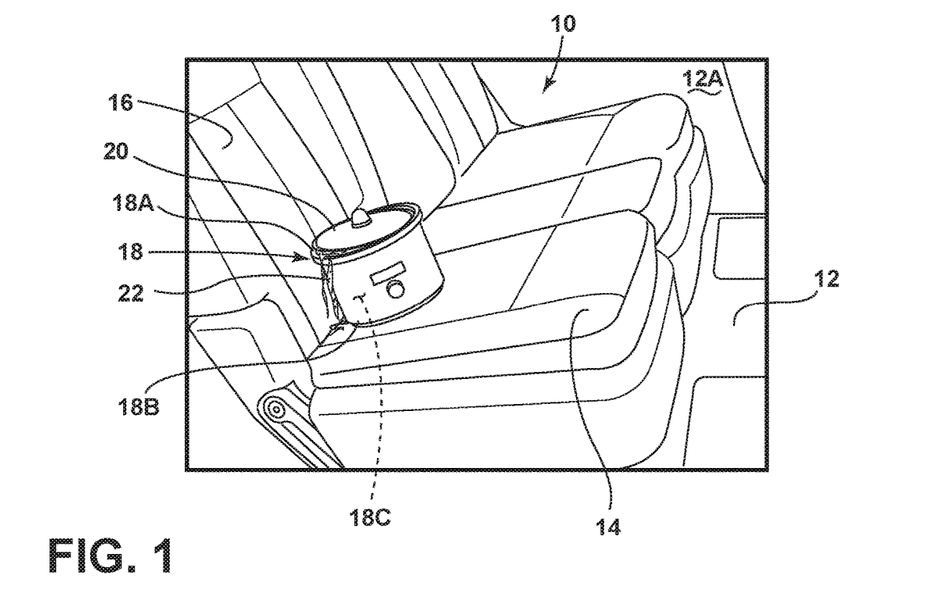
FIG. 1 is a top perspective view of a vehicle seating assembly supporting a container in a non-level position.

Referring now to FIG. 1, a vehicle seating assembly 10 is shown disposed within a vehicle 12, and specifically shown disposed within a vehicle interior 12A. The vehicle seating assembly 10 is shown in the form of a rear seat, however, it is contemplated that the present invention may be used with any vehicle seating assembly having an unlevel seating surface. As shown in FIG. 1, the vehicle seating assembly 10 includes a seating surface 14 that is a rearwardly inclined seating surface that is not level. The vehicle seating assembly 10 further includes a seatback 16 which is shown in FIG. 1 as being rearwardly reclined. A container 18 is shown supported on the rearwardly inclined seating surface 14 in an off camber position due to the rearward angle of the seating surface 14. The container 18 includes an open top 18A and a base portion 18B. The container 18 further includes a cavity 18C and is shown in the form of a slow cooker appliance in the embodiment shown in FIG. 1. While the container 18 is shown as a slow cooker appliance in FIG. 1, it is contemplated that any container can benefit from use of the present invention, as further described below. The container 18 further includes a lid 20 that is configured to be received on the open top 18A to contain the contents 22 of the container 18 during transport. As shown in FIG. 1, the lid 20 has opened and the contents 22 have spilled out of the container 18 generally due to the rearwardly inclined angle of the seating surface 14 on which the container 18 is supported at base portion 18B. Thus, the present invention seeks to provide a level surface on which the container 18 can be supported to ensure that the container 18 is transported without spilling the contents 22 thereof and without damaging or staining the vehicle seating assembly 10.

Figure 2:
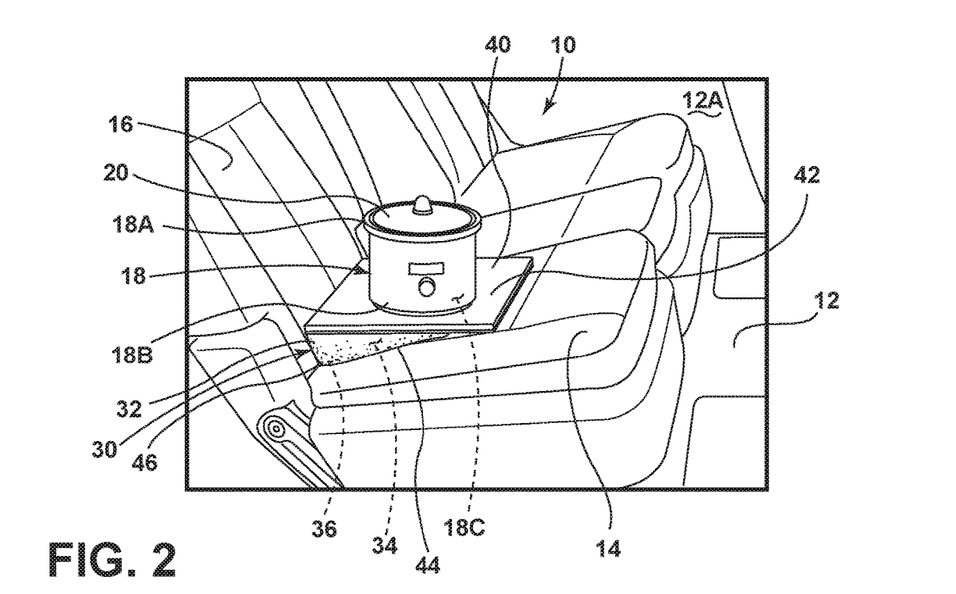
FIG. 2 is a top perspective view of the container of FIG. 1 supported in an upright position on a seat leveler device disposed on the vehicle seating assembly.

Referring now to FIG. 2, a seat leveler device 30 is shown having a support portion 32 with an upper support surface 40 disposed thereon. The container 18 is supported at the base portion 18B in an upright position on the upper support surface 40 of the seat leveler device 30. The support portion 32 of the seat leveler device 30 includes a cavity 34 that is filled with a shape-conforming medium 36. The cavity 34 is defined by a conformable outer casing 46 that is comprised of a flexible cover material which surrounds and encloses the shape-conforming medium 36. The flexible cover material of the outer casing 46 is configured to flex with the shape-conforming medium 36 in use. The support portion 32 of the seat leveler device 30 includes a seat engaging surface 44 which is configured to contact and abut the seating surface 14 of the vehicle seating assembly 10 in use. The support portion 32 of the seat leveler device 30 includes an overall wedge-shaped configuration that is configured to compliment the rearward inclined angle of the seating surface 14 of the vehicle seating assembly 10. With the support portion 32 having a flexible cover material for the outer casing 46 and shape-conforming medium 36 disposed within the cavity 34 thereof, the seat leveler device 30 is configured to be supported on various vehicle seat assemblies having different shapes, sizes and angles. This is generally due to the polymorphic nature of the support portion 32. The shape-conforming medium 36 may include microbeads, gel, silica, or other like medium that can be contained by the outer casing 46 and is polymorphic.

The upper support surface 40 is a generally rigid and planar support surface that is generally disposed in a substantially horizontal position as shown in FIG. 2 as supported by the support portion 32 of the seat leveler device 30. In this way, the upper support surface 40 provides a horizontal and planar support surface for supporting the container 18 therefrom. The upper support surface 40 may be constructed from a wood, metal, or plastic material and may further include a non-slip surface material 42 that further helps to stabilize the container 18 as supported thereon. The non-slip surface material 42 may include a rubberized coating or silicone coating that substantially covers the upper support surface 40 and provides a gripping feature between the container 18 and the seat leveler device 30. Thus, as shown in FIG. 2, the seat leveler device 30 provides a generally level surface in upper support surface 40 as supported by the support portion 32 on the angled seating surface 14 of the vehicle seating assembly 10.

Figure 3:
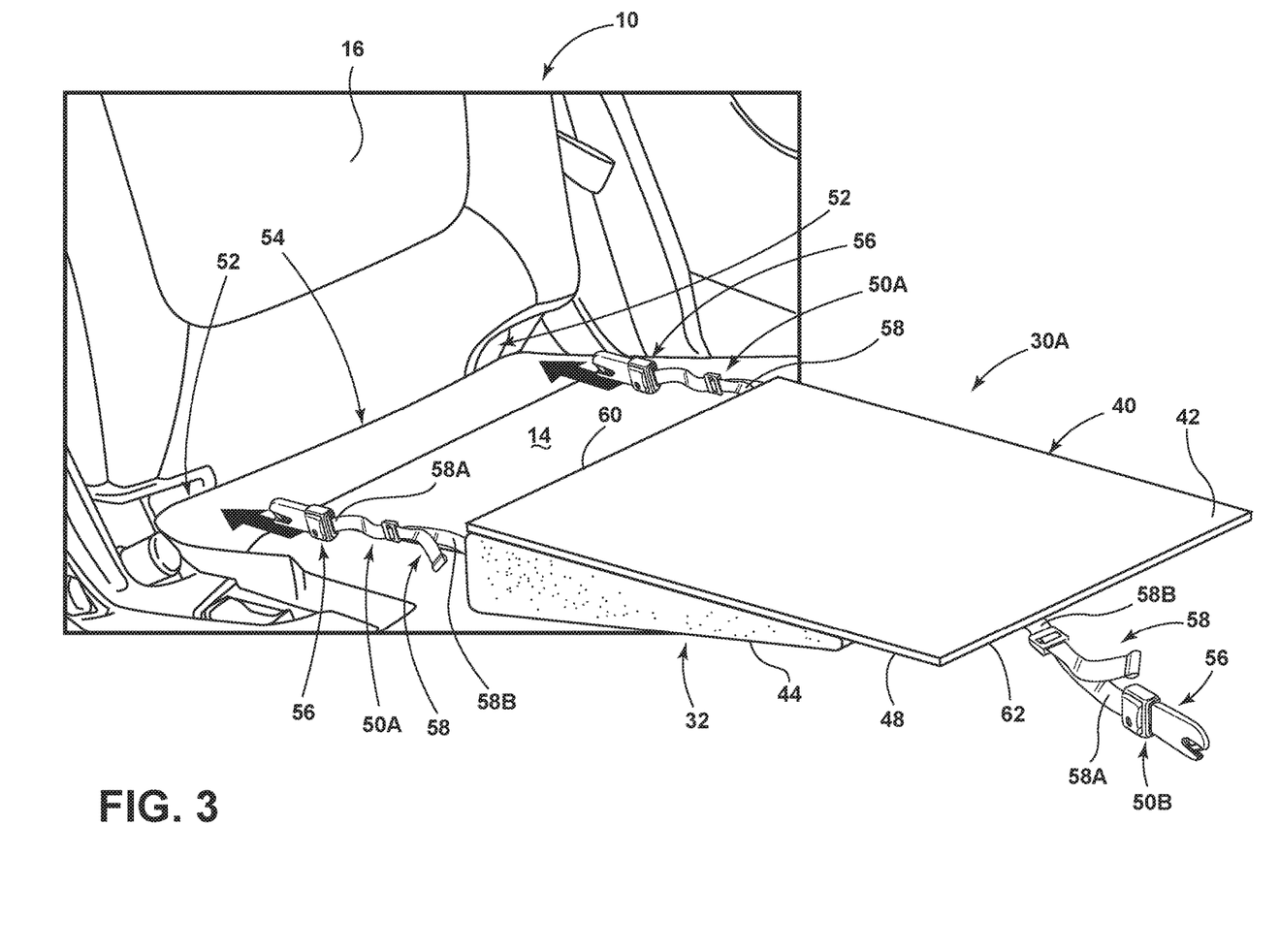
FIG. 3 is a top perspective view of one embodiment of a seat leveler device exploded away from a vehicle seating assembly.

Referring now to FIG. 3, another embodiment of the seat leveler device 30A is shown having numerous features that mirror the features of the seat leveler device 30 shown and described above in FIG. 2. Thus, like reference numerals are used to describe the similar features found between the seat leveler device 30 and the seat leveler device 30A. In the embodiment shown in FIG. 3, the seat leveler device 30A includes a plurality of anchor members 50A, 50B extending outwardly therefrom. In the embodiment shown in FIG. 3, the vehicle seating assembly 10 includes a plurality of anchoring locations 52 disposed along a crease 54 which is positioned between the seatback 16 and the seating surface 14 of the vehicle seating assembly 10. The anchor locations 52 are generally contemplated to be ISOFIX anchoring locations which are common anchoring locations for securing a child seat to a vehicle seating assembly. The anchoring locations 52 may include a steal bar that forms a loop that is used to couple a child seat to a vehicle seating assembly. The loop is generally connected to a seat frame assembly and is known in the art as a preferred anchoring location for a child seating device. The anchor members 50A of the seat leveler device 30A make use of the anchor locations 52 of the vehicle seating assembly 10, wherein clip members 56 are coupled to adjustable straps 58 at a first end 58A thereof. The adjustable straps 58 further include a second end 58B which is coupled to the seat leveler device 30A at either the support portion 32, or an underside 48 of the upper support surface 40. In the embodiment shown in FIG. 3, the anchor members 50A extend outwardly from a rear portion 60 of the seat leveler device 30A, while anchor member 50B extends outwardly from a front portion 62 of the seat leveler device 30A. The anchor member 50B also includes a clip member 56 that is coupled to the front portion 62 of the seat leveler device 30A via an adjustable strap 58 in a manner similar to the adjustable straps 58 described above with reference to anchor members 50A. The anchor member 50B is contemplated to be coupled to an anchoring location 53 (FIG. 6) disposed on a front side of the vehicle seating assembly 10 that is generally known for attachment of a child seat device using an ISOFIX connecting bar. When the clip members 56 have been coupled to the anchoring locations 52, 53 of the vehicle seating assembly 10, the adjustable straps 58 can be tightened to securely retain the seat leveler device 30A on the seating surface 14 of the seating assembly 10. The anchor members 50A couple to anchoring locations 52 by moving the clip members 56 of the anchor members 50A to the ISOFIX anchoring locations 52 of the vehicle seating assembly 10 in the direction as indicated by the arrows illustrated in FIG. 3. Thus, the clip members 56 define engagement features that are tethered to the seat leveler device 30A at support surface 40 or support portion 32.

Referring now to FIG. 4, the seat leveler device 30A is shown, wherein the outer casing 46 is disposed only below a first portion 48A of the underside 48 of the support surface 40. A second portion 48B of the underside 48 of the support surface 40 is exposed, such that the second portion 48B rests directly against a forward portion of the vehicle seating surface 14 (as shown in FIG. 2). Accordingly, the outer casing 46 of the support portion 32 extends to an intermediate portion of the underside 48 of the support surface 40. As further shown in FIG. 4, the shape-conforming medium 36 disposed within the cavity 34 is comprised of a plurality of microbeads. This shape-conforming medium 36 allows the conformable outer casing 46 to conform to the shape of the seating surface 14 of the vehicle seating assembly 10 as supported thereon. Thus, the seat engaging surface 44 of the conformable outer casing 46 can assume an angled position that is complimentary to the rearwardly inclined angle of the seating surface 14 of the vehicle seating assembly 10. The angle of the seat engaging surface 44 is described as "complimentary" which, for the purposes of this disclosure, means that the angle of the seat engaging surface 44 abuts the rearwardly inclined angle of the seating surface 14 of the vehicle seating assembly 10 in such a manner as to support the support surface 40 in a substantially horizontal manner on the vehicle seating assembly 10. The shape-conforming medium 36 must freely move within the cavity 34 defined by the outer casing 46. Thus, the multitude of microbeads move freely within the cavity 34 defined by the outer casing 46 to provide a complimentary angle for the seat engaging surface 44 relative to the rearwardly inclined angle of the seating surface 14 of the vehicle seating assembly 10. The shape-conforming medium 36 may also comprise a composition having a gel component that substantially fills the cavity 34 defined by the outer casing 46, yet freely moves within the cavity 34 to conform to seating surface 14.

Figure 5:
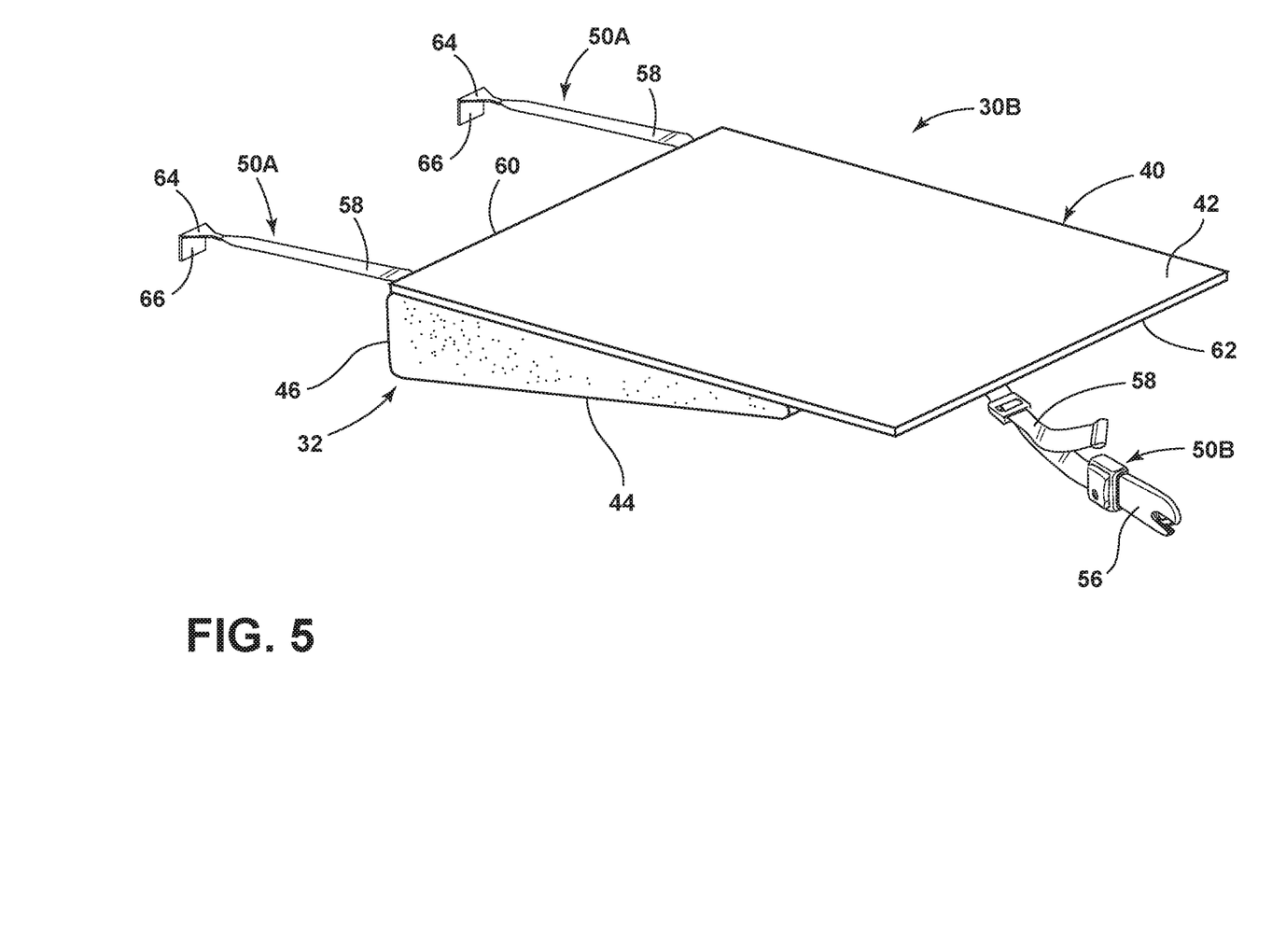
FIG. 5 is a top perspective view of a seat leveler device according to another embodiment.
Figure 6:
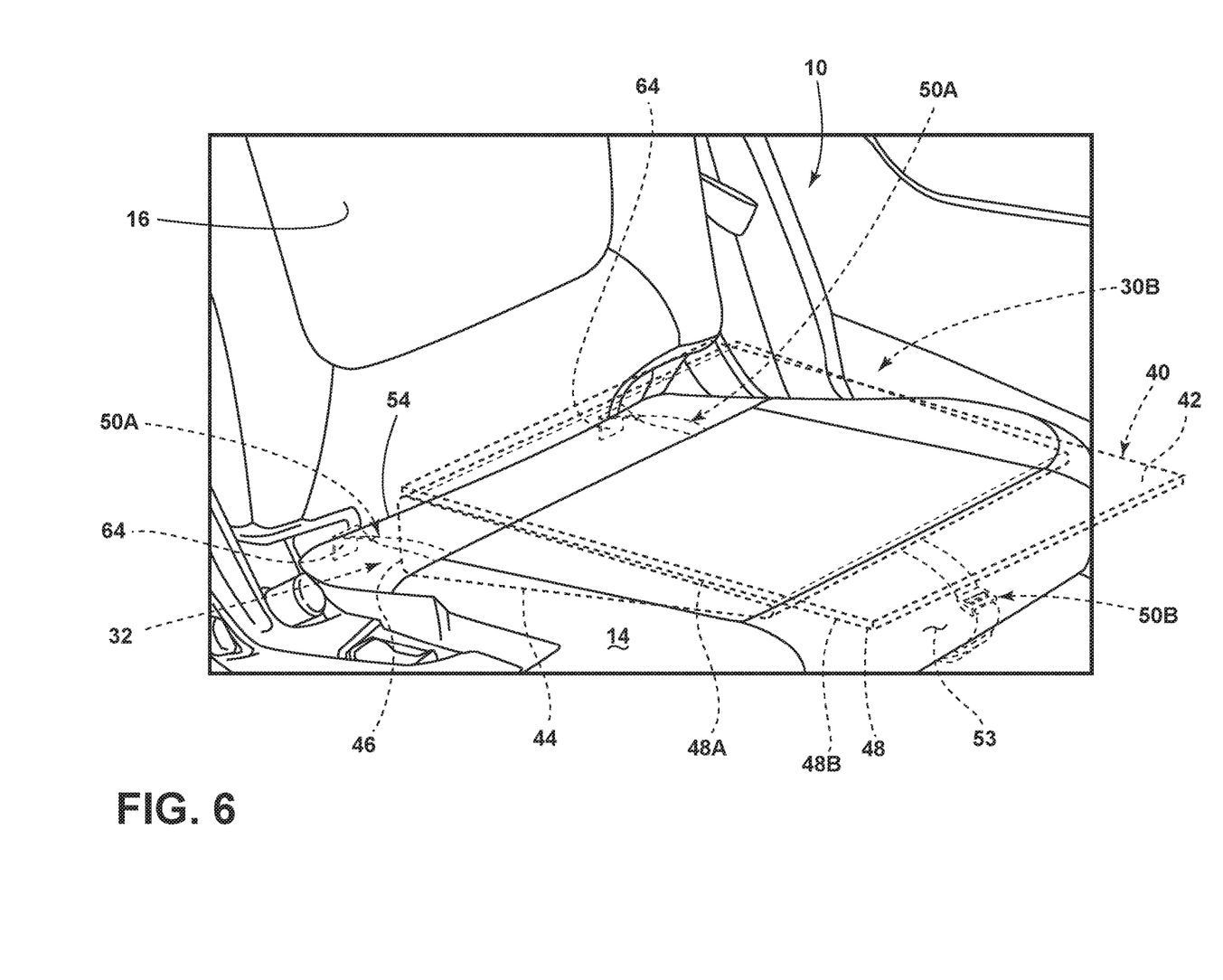
FIG. 6 is a top perspective view of the seat leveler device of FIG. 5 shown in phantom as coupled to a vehicle seating assembly.

Referring now to FIG. 5, another embodiment of the seat leveler device 30B is shown having numerous features that mirror the features of the seat leveler devices 30 and 30A shown and described above. Thus, like reference numerals are used to describe the similar features found between the seat leveler devices 30, 30A and the seat leveler device 30B. In the embodiment shown in FIG. 5, the seat leveler device 30B includes anchor members 50A extending outwardly from the rear portion 60 thereof. In the embodiment shown in FIG. 5, the rear anchor members 50A include engagement hooks 64. The engagement hooks 64 each include downwardly extending tabs 66 which are configured to be received in the crease 54 disposed between the seatback 16 and the seating surface 14 of the vehicle seating assembly 10 as best shown in FIG. 6. In this way, the engagement hooks 64 engage the vehicle seating assembly 10 from a rear portion 60 of the seat leveler device 30B. As further shown in FIG. 6, the seat leveler device 30B is shown disposed on the seating surface 14 of the vehicle seating assembly 10. As shown in FIG. 6, the second portion 48B of the underside 48 of the support surface 40 is shown in direct contact with the seating surface 14 of the vehicle seating assembly 10. The support portion 32 of the seat leveler device 30B is shown having the seat engaging surface 44 disposed at an angle that is complimentary to the rearward angle of the inclined seating surface 14. In this way, the support portion 32 supports the support surface 40 in a substantially horizontal manner relative to the seating surface 14 of the vehicle seating assembly 10. As further shown in FIG. 6, the front anchor member 50B is shown coupled to anchoring location 53 of the vehicle seating assembly 10, wherein the anchoring location 53 is contemplated to be an ISOFIX anchoring location to which front anchor member 50B can engage using clip member 56 (FIG. 5). Thus, using the rear anchor members 50A and the front anchor member 50B, the seat leveler device 30B is adequately secured on the seating surface 14 of the vehicle seating assembly 10 for transport of an item on the support surface 40 thereof.

Figure 7A:
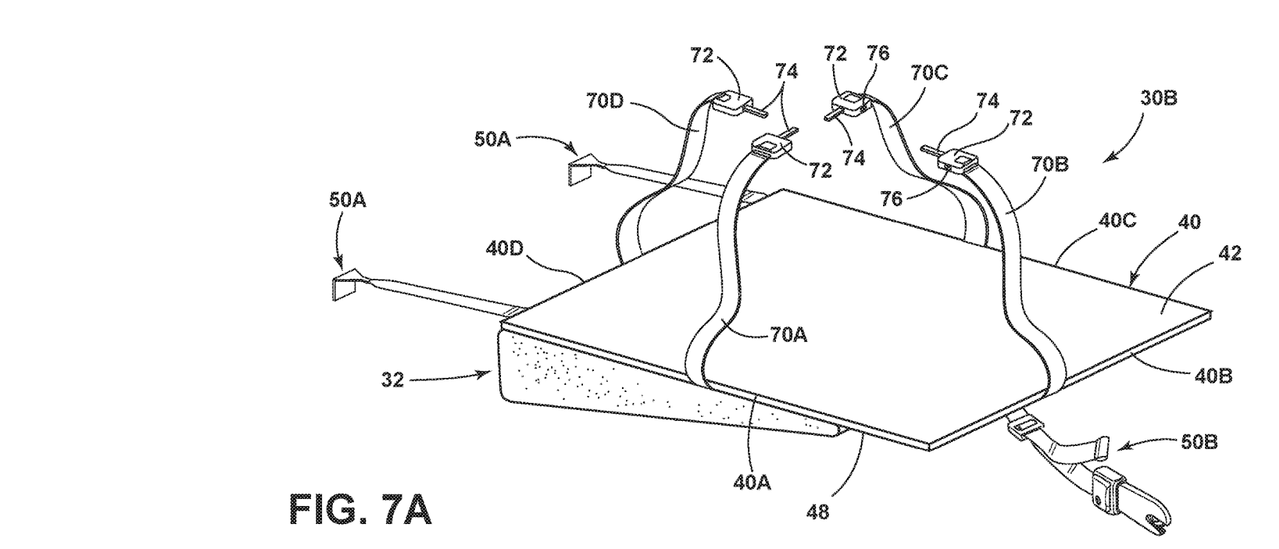
FIG. 7A is a top perspective view of the seat leveler device of FIG. 6, having a plurality of uncoupled cargo retaining straps.
Figure 7B:
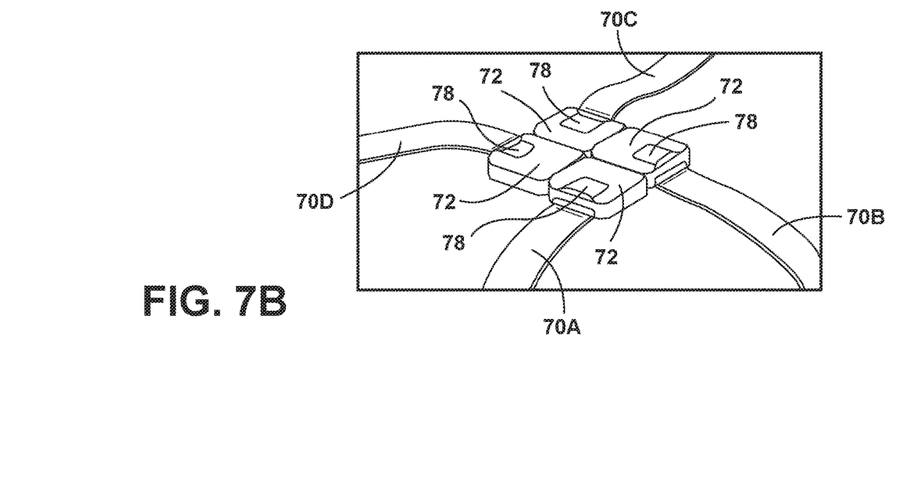
FIG. 7B is a top perspective view of the cargo retaining straps of FIG. 7A in a coupled condition.

Referring now to FIG. 7A, the seat leveler device 30B is shown having a plurality of retaining straps 70A-70D. The retaining straps 70A-70D are coupled to the support surface 40 at the underside 48 thereof. Each retaining strap 70A-70D extends outwardly from one of the perimeter edges 40A-40D of the support surface 40 that make up the outer perimeter thereof. The retaining straps 70A-70D are configured to clip to one another to retain an object in place on the support surface 40 during transit of the same. As shown in FIG. 7A, the retaining straps 70A-70D each include clip members 72 having an engagement member 74 and a receiving channel 76 for receiving an engagement member 74 of an adjacent clip member 72. In this way, the retaining straps 70A-70D are configured to couple to one another in a four-way connection configuration as shown in FIG. 7B. Thus, the retaining straps 70A-70D are operable between coupled and uncoupled positions with one another via clip members 72, wherein the retaining straps 70A-70D are disposed over the support surface 40 when they are in the coupled position as indicated in FIG. 7B. As further shown in FIG. 7B, the clip members 72 of the retaining straps 70A-70D further include release buttons 78 which can release the retaining straps 70A-70D from one another. In the embodiment shown in FIG. 7B, the clip members 72 are arranged in a four-way coupled configuration, however, it is contemplated that the retaining straps 70A-70D can be clipped in multiple combinations in order to accommodate a particular item supported on the seat leveler device 30B at support surface 40.

Figure 8:
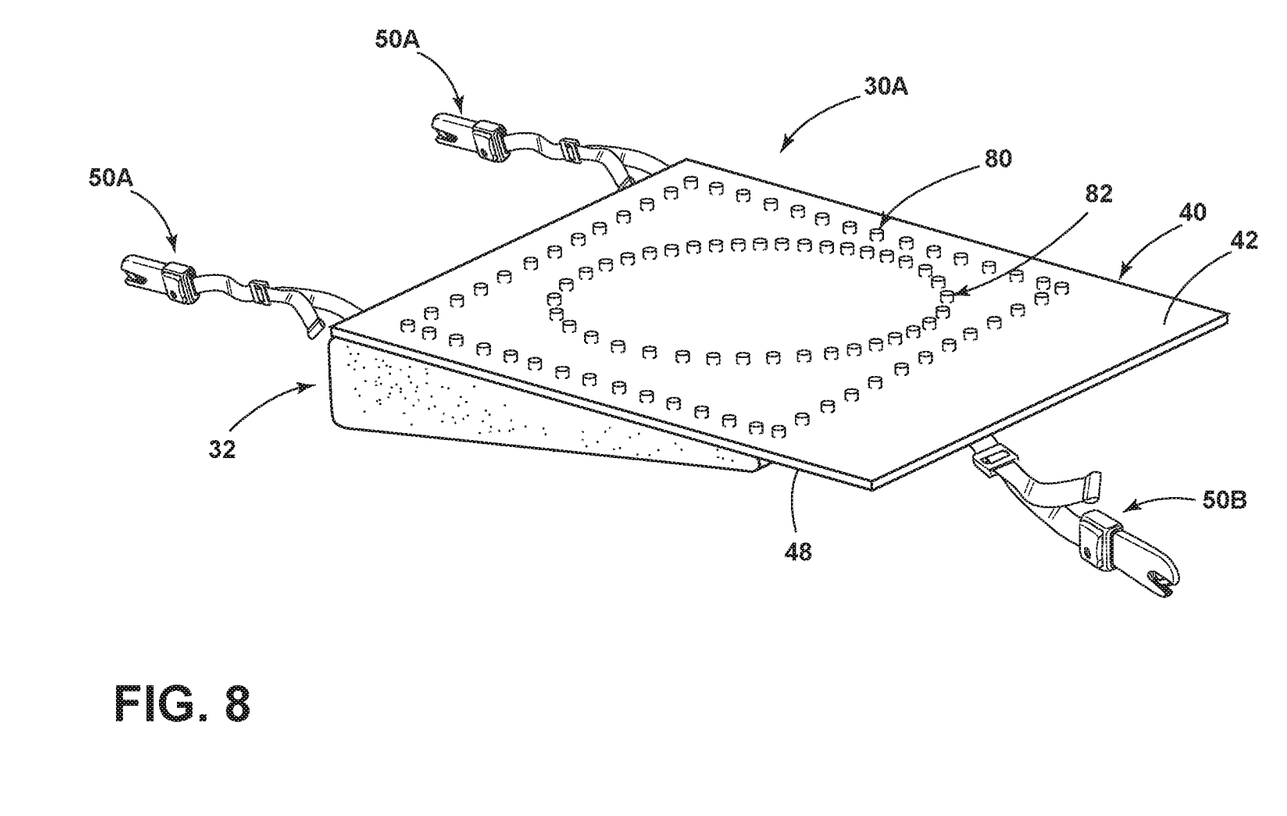
FIG. 8 is a top perspective view of a seat leveler device according to another embodiment having a plurality of raised engagement features disposed on an upper support surface thereof.

Referring now to FIG. 8, the seat leveler device 30A is shown, wherein the support surface 40 includes a plurality of raised engagement features 80, 82. In the embodiment shown in FIG. 8, the raised engagement features 80 are disposed in a square-shaped configuration to help retain a square-shaped container in place on the support surface 40 during transit. The raised engagement features 82 are shown disposed in a circular arrangement for supporting a container having a circular base in transit. The raised engagement features 80, 82 are shown disposed in specific configurations on the support surface 40 in the embodiment shown in FIG. 8, however, it is contemplated that any configuration of raised engagement features may be used with the present device for helping to retain an object transported on the seat leveler device 30A in place on the support surface 40.

Figure 9A:
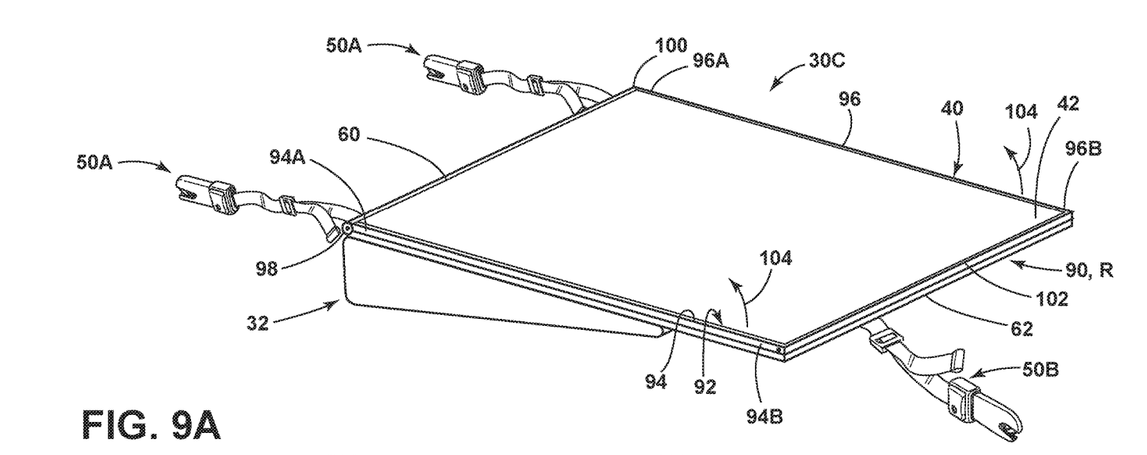
FIG. 9A is a top perspective view of a seat leveler device according to another embodiment having a retainer feature shown in a retracted position.
Figure 9B:
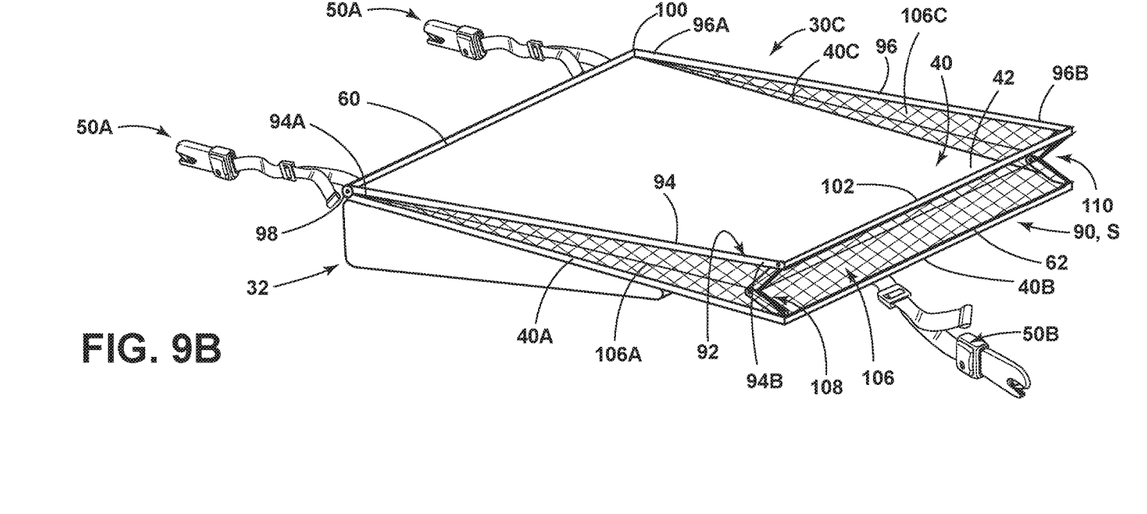
FIG. 9B is a top perspective view of the seat leveler device of FIG. 9A with the retainer feature shown in a semi-deployed position.

Referring now to FIGS. 9A and 9B, another embodiment of a seat leveler device 30C is shown, wherein the support surface 40 is supported on the support portion 32 thereof. With specific reference to FIG. 9A, a deployable retainer wall 90 is shown in a retracted position R. The retracted position R may also be referred to as a stowed position for the deployable retainer wall 90. The deployable retainer wall 90 includes a frame assembly 92 having first and second side members 94, 96 which are pivotally coupled to the support surface 40 at hinges 98 and 100 disposed at rear portions 94A, 96A of the side members 94, 96 along perimeter edge 40D of the support surface 40. At front portions 94B, 96B of the side members 94, 96, a cross member 102 is shown interconnecting the side members 94, 96. The deployable retainer wall 90 moves from the retracted position R to a deployed position D (FIG. 9C) by moving the side members 94, 96 upwardly along the path as indicated by arrows 104. As shown in FIG. 9B, the deployable retainer wall 90 is shown in a semi-deployed position S, wherein the frame assembly 92 is raised above the support surface 40. As the frame assembly 92 moves upward, a mesh retaining wall 106 is deployed. Specifically, the mesh retaining wall 106 includes three portions 106A-106C. Portion 106A is disposed between side member 94 and perimeter edge 40A of support surface 40. Portion 106B is disposed between cross member 102 and perimeter edge 40B of support surface 40. Portion 106C is disposed between side member 96 and perimeter edge 40C of the support surface 40. As further shown in FIG. 9B, hinged locking members 108, 110 are shown coupled to the support surface 40 and the front portions 94B, 96B of the first and second side members 94, 96 of the frame assembly 92. The hinged locking members 108, 110 are configured to lock the deployable retainer wall 90 in the fully deployed position D with the hinged locking members 108, 110 in locked positions L as shown in FIG. 9C.

Figure 9C:
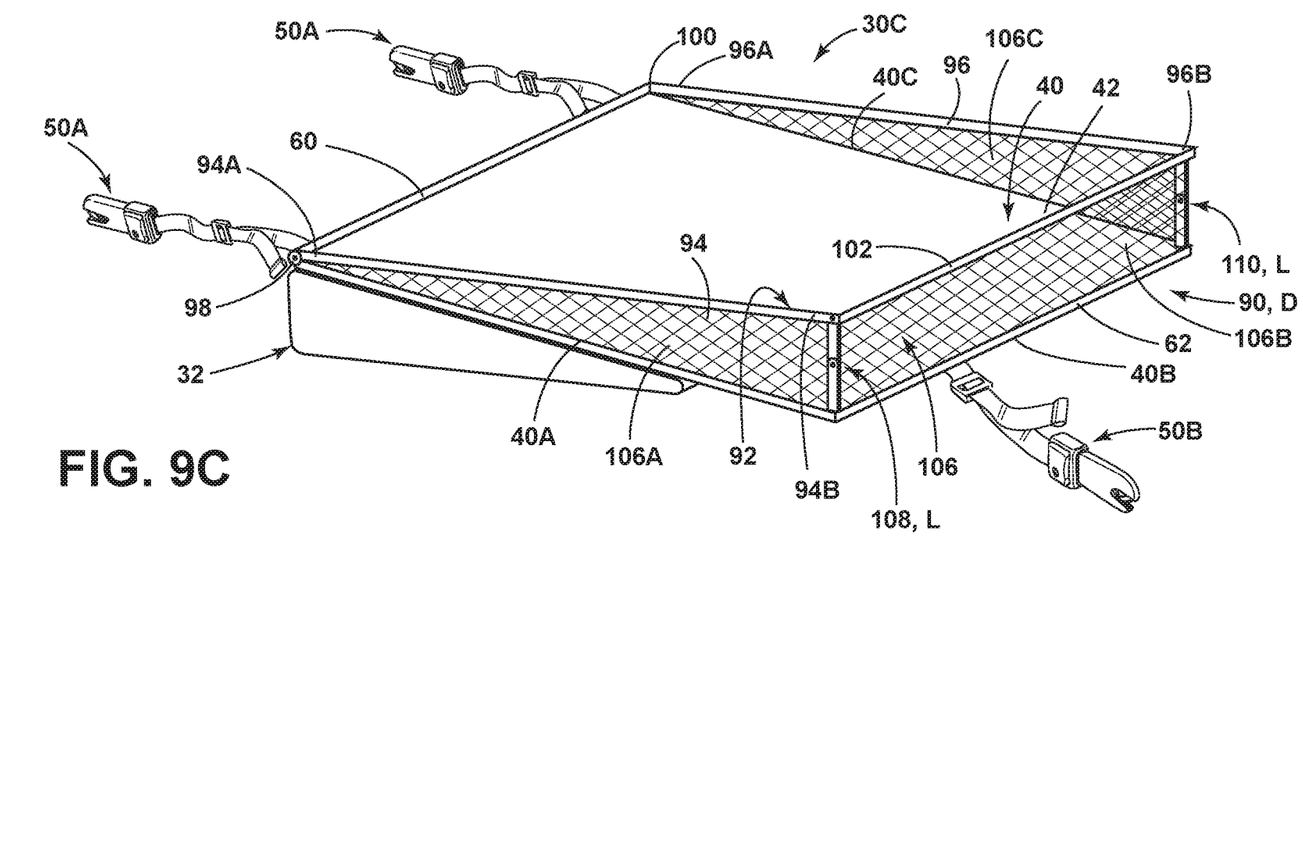
FIG. 9C is a top perspective view of the seat leveler device of FIG. 9A with the retainer feature shown in a fully deployed position.

Referring now to FIG. 9C, the deployable retainer wall 90 is shown in the fully deployed position D, wherein the mesh retaining wall 106 is supported from the frame assembly 92 and upwardly extending from perimeter edges 40A, 40B and 40C of the support surface 40. In this way, the deployable retainer wall 90 can retain items in transit supported on the support surface 40 of the seat leveler device 30C particularly during a braking sequence of the vehicle in which the seat leveler device 30C is disposed. Hinged locking members 108, 110 are shown locked out in a substantially vertical position. In the embodiment shown in FIGS. 9A-9C, the deployable retainer wall 90 includes the three portions 106A-106C of the mesh retaining wall 106, however, it is contemplated that any configuration for the mesh retaining wall 106 can be used and may include more portions than the three portions 106A-106C shown.

Figure 10A:
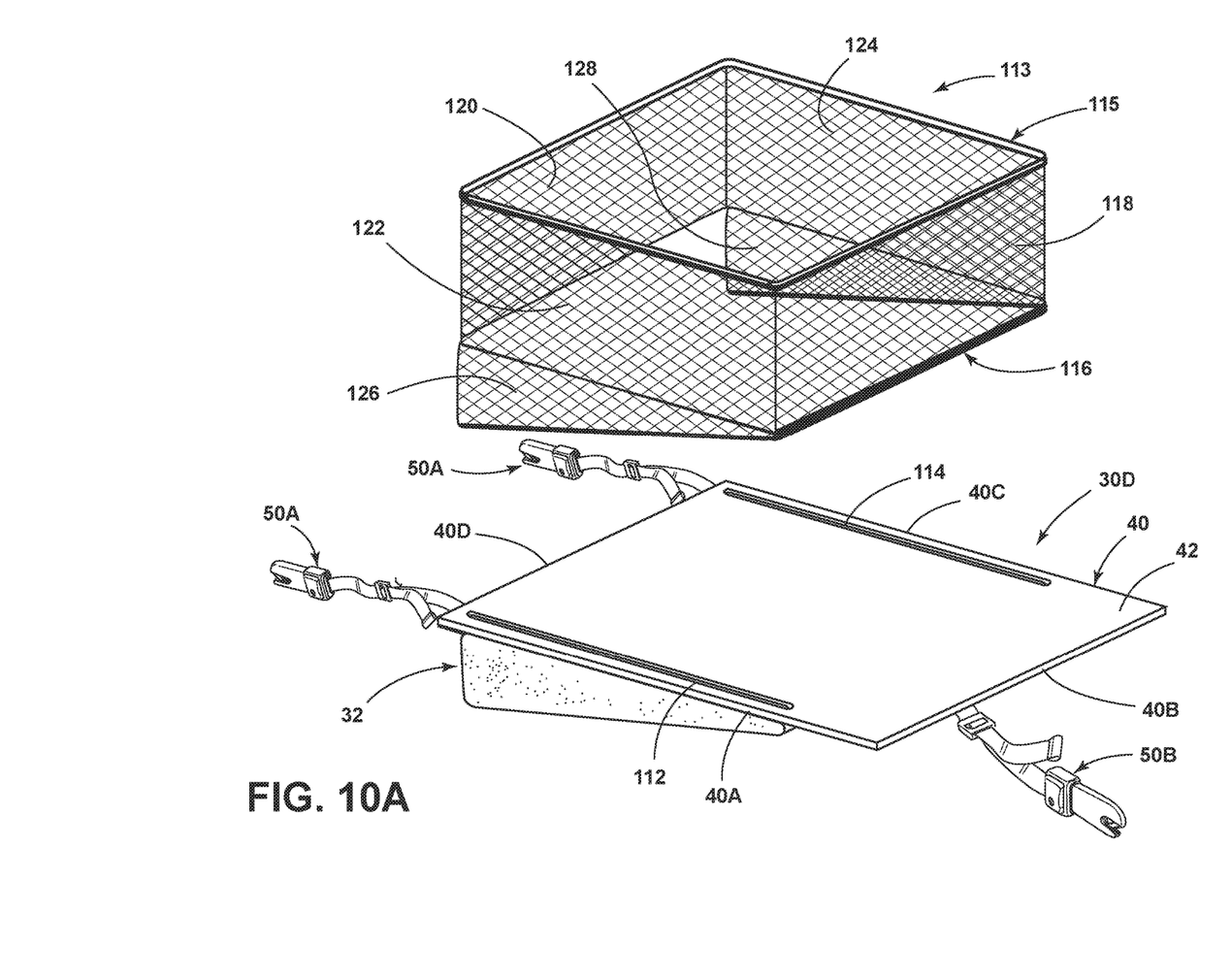
FIG. 10A is a top perspective view of a seat leveler device according to another embodiment with a retaining cage exploded away therefrom.

Referring now to FIG. 10A, a seat leveler device 30D, according to another embodiment, is shown. The seat leveler device 30D includes the support surface 40 disposed on the support portion 32 with anchor members 50A, 50B extending outwardly therefrom. The support surface 40 of the seat leveler device 30D sticks out past the parameters of the support portion 32 at perimeter edges 40A and 40C and further includes first and second slots 112, 114 disposed through the support surface 40. Specifically, first slot 112 is disposed along and adjacent to perimeter edge 40A of the support surface 40. Second slot 114 is shown disposed along and adjacent to perimeter edge 40C of the support surface 40. Other configurations for the first and second slots 112, 114 are contemplated for use with the present invention. As further shown in FIG. 10A, a cage assembly 113 is shown exploded away from the seat leveler device 30D and includes an upper frame 115 and lower frame 116 having front and rear walls 118, 120 that are interconnected by sidewalls 122, 124. The sidewalls 122, 124 further include base portions 126, 128 which are configured to be received through the first and second slots 112, 114 of the support surface 40 of the seat leveler device 30D. In the embodiment shown in FIGS. 10A and 10B, the cage assembly 113 is a wire cage assembly, however, a solid cage assembly may also be used along with other cage configurations for achieving the purposes of the present invention.

Figure 10B:
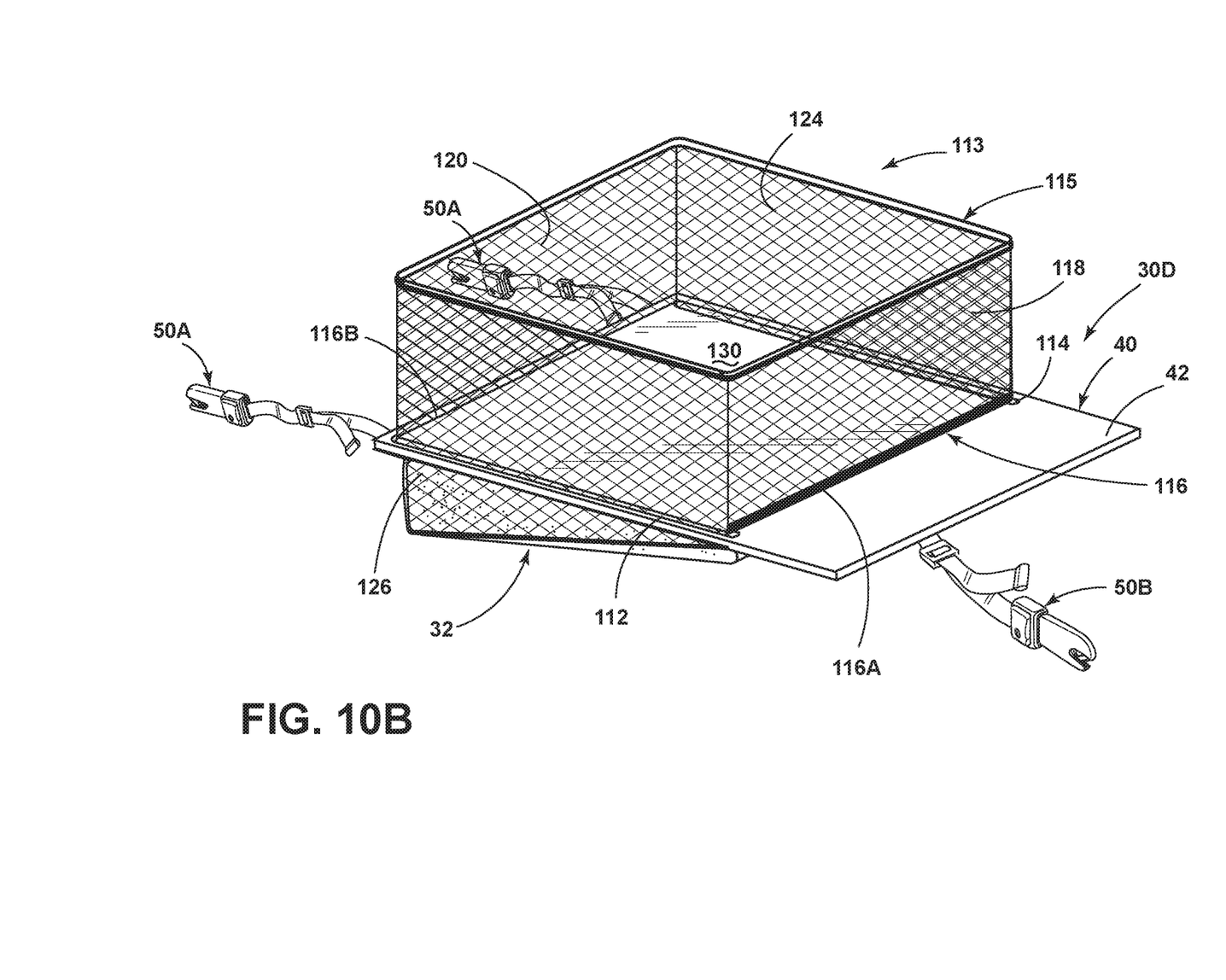
FIG. 10B is a top perspective view of the seat leveler device of FIG. 10A showing the retaining cage received on the seat leveler device.

Referring now to FIG. 10B, the cage assembly 113 is shown received on the support surface 40 of the seat leveler device 30D, wherein the base portion 126 of sidewall 122 is shown received through first slot 112 of the support surface 40. Further, base portion 128 of sidewall 124 of the cage assembly 113 is contemplated to be received through second slot 114 through the support surface 40. In this way, a front portion 116A and a rear portion 116B of the lower frame 116 is supported directly on the support surface 40, while the base portions 126, 128 of the cage assembly 113 retain the cage assembly 113 on the support surface 40 within slots 112, 114. The walls 118, 120, 122 and 124 of the cage assembly 113 define a caged area 130 that can be used to transport items in a retained manner on the seat leveler device 30D. It is further contemplated that the cage assembly 113 may include a top or cover, such that the cage assembly 113 can be used to transport a pet within the caged area 130 of the cage assembly 113. Thus, the caged area 130 is defined by an upper portion of the cage assembly 113 that is defined by the front and rear walls 118, 120 and sidewalls 122, 124 which are interconnected and disposed above the support surface 40 when the cage assembly 113 is removeably received on the seat leveler device 30D.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seat leveler device for use with a vehicle seating assembly having an inclined seating surface, the seat leveler device comprising:

a support portion having a wedge-shaped conformable outer casing with a seat engaging surface arranged at an angle complimentary to an angle of the inclined seating surface;

a support surface supported by the support portion in a substantially horizontal configuration; and one or more anchor members having engagement features tethered to one of the support surface and the support portion, wherein the engagement features are configured to couple to anchoring locations disposed on the vehicle seating assembly, and further wherein the one or more anchor members are tethered to the anchoring locations of the vehicle seating assembly by adjustable straps.

2. The seat leveler device of claim 1, wherein the outer casing defines a cavity filled with a shape-conforming medium.

3. The seat leveler device of claim 2, wherein the shape-conforming medium includes a multitude of microbeads.

4. The seat leveler device of claim 2, wherein the shape-conforming medium includes a composition including a gel component.

5. The seat leveler device of claim 1, wherein the support surface includes a non-slip surface material disposed thereon.

6. The seat leveler device of claim 5, wherein the non-slip surface material includes one of a rubberized coating and a silicone coating.

7. The seat leveler device of claim 1, wherein the anchoring locations of the vehicle seating assembly include ISOFIX anchoring locations, and further wherein the engagement features of the one or more anchor members include clip members configured to releasably clip to the ISOFIX anchoring locations of the vehicle seating assembly.

8. The seat leveler device of claim 1, including:
a plurality of retaining straps, wherein each retaining strap of the plurality of retaining straps includes a clip member, the clip members of the retaining straps are operable between coupled and uncoupled positions with one another, wherein the clip members are disposed over the support surface when the clip members are coupled to one another.

9. The seat leveler device of claim 1, wherein the one or more anchor members include at least one anchor member extending outwardly from a rear portion of the seat leveler device and at least one anchor member extending outwardly from a front portion of the seat leveler device.

10. A seat leveler device for use with a vehicle seating assembly, comprising:
a support portion having a wedge-shaped conformable outer casing filled with a shape-conforming medium comprised of a multitude of microbeads;

a support surface coupled to the support portion and supported by the support portion in a substantially horizontal configuration on an inclined seating surface of the vehicle seating assembly; and one or more anchor members having engagement features tethered to one of the support surface and the support portion at rear portions thereof, wherein the engagement features are configured to couple to anchoring locations disposed on the vehicle seating assembly.

11. The seat leveler device of claim 10, wherein the support surface includes a plurality of raised engagement features.

12. The seat leveler device of claim 10, including:
a deployable retainer wall operably coupled to the support surface and operable between retracted and deployed positions.

13. The seat leveler device of claim 12, wherein the deployable retainer wall includes a frame assembly supporting a mesh retaining wall.

14. A seat leveler device for use with a vehicle seating assembly, comprising:
a support portion having a wedge-shaped outer casing filled with a multitude of microbeads;

a support surface disposed above the support portion; and one or more anchor members, wherein the one or more anchor members include engagement features tethered to one of the support surface and the support portion, wherein the engagement features couple to anchoring locations disposed on the vehicle seating assembly.

15. The seat leveler device of claim 14, wherein the support surface includes one or more slots disposed therethrough.

16. The seat leveler device of claim 15, including:
a cage assembly having an upper portion and a base portion, wherein a portion of the base portion is removeably received through the one or more slots disposed through the support surface.

17. The seat leveler device of claim 14, including:
a plurality of retaining straps operable between coupled and uncoupled positions, wherein the retaining straps are disposed over the support surface in the coupled position.

* * * * *